United States Patent
Oh et al.

(10) Patent No.: US 9,760,662 B1
(45) Date of Patent: Sep. 12, 2017

(54) SIMULATING PERFORMANCE, RELIABILITY, WEIGHT, AND COST USING A PHYSICAL MODEL

(71) Applicant: XLDyn, LLC, Brighton, MI (US)

(72) Inventors: Kong Ping Oh, Troy, MI (US);
Thomas Tecco, Brighton, MI (US)

(73) Assignee: XLDYN, LLC., Brighton, MI (US)

(*) Notice: Subject to any disclaimer, the term of this patent is extended or adjusted under 35 U.S.C. 154(b) by 0 days.

(21) Appl. No.: 15/155,376

(22) Filed: May 16, 2016

(51) Int. Cl.
*G06F 17/50* (2006.01)

(52) U.S. Cl.
CPC .................. *G06F 17/5009* (2013.01)

(58) Field of Classification Search
CPC .................................. G06F 17/5009
USPC ............................................. 703/1
See application file for complete search history.

(56) References Cited

U.S. PATENT DOCUMENTS

2004/0027398 A1* 2/2004 Jaeger .................. G06F 3/0481
715/863

* cited by examiner

*Primary Examiner* — Saif Alhija
(74) *Attorney, Agent, or Firm* — Condo Roccia Koptiw LLP

(57) ABSTRACT

Measures of effectiveness (MoEs) of a system, including MoEs derived from physical variables and MoEs derived from non-physical variables, can be calculated using a single model using the same software system and the same set of data. Setting up and performance of trade-off studies may be facilitated. Data needed for simulation, including physical attributes such as inertia and spring rate and non-physical attributes such as cost, weight, and mean time between failures, may be persisted in the same manner. Different topologies may be created from the same model. A physical topology may include information that may be used to generate the governing systems equations based on laws of physics. A conceptual topology may include non-physical information, such as weight and cost information, and information that may be used to generate the governing systems equations based on probabilistic principles.

18 Claims, 10 Drawing Sheets

| Name | Weight, kg | Cost, US$ | MTBF, Year |
|---|---|---|---|
| SpeedSensor1 | 1 | 1 | 10 |
| Table2D1 | 1 | 1 | 10 |
| Resistor1 | 1 | 1 | 10 |
| SwitchOver1 | 1 | 1 | 10 |
| GearSelector1 | 1 | 1 | 10 |
| Inertia2 | 1 | 1 | 10 |
| LockUpClutch1 | 1 | 1 | 10 |
| Inertia1 | 1 | 1 | 10 |
| Ground1 | 1 | 1 | 1 |
| EMF1 | 1 | 1 | 1 |
| ZeroOrderHold1 | 1 | 1 | 1 |
| SignalVoltage1 | 1 | 1 | 1 |
| NetTorque1 | 1 | 1 | 1 |
| Torque1 | 1 | 1 | 1 |
| VelocitytoRPMMetric1 | 1 | 1 | 1 |

FIG. 4

SIMULATING PERFORMANCE, RELIABILITY, WEIGHT, AND COST USING A PHYSICAL MODEL

TECHNICAL FIELD

The disclosure relates generally to computer-implemented modeling of systems. More particularly, the disclosure relates to user interfaces and methods for lumped-parameter dynamic system, reliability, cost and weight modeling.

BACKGROUND

In designing an engineering system, a practitioner may use a graphical model comprised of connected building blocks to simulate the system behavior and calculate system performance indicators with computers. The model may include building blocks that may be physical in nature, such as mass, springs, electrical resistors, and the like. Such models may embody laws of physics and may be called physical models. Software systems known as lumped-parameter dynamic systems simulators can process a graphical model to create graphs depicting system behavior. Numerical results may be further processed to yield measures of effectiveness (MoE) of a design. Examples of MoEs may include fuel economy, fatigue life, noise level, etc.

MoEs may be related to physical variables such as velocity, temperature, or voltage. Other criteria, such as, for example, cost, weight, or reliability targets, may also be used as MoEs. For reliability calculations, the practitioner may use another type of graphical model, called a fault tree or reliability block diagram (RBD), to calculate the likelihood that a system can deliver its intended functions. RBD may include connected building blocks that may be characterized by failure rates, such as mean time between failures. Reliability models may also differ from lumped-parameter dynamic models in how the blocks are processed to yield the MoEs.

For cost and weight analysis, the practitioner may use spreadsheets or similar software that may provide accounting functions. A practitioner may perform a trade-off analysis involving cost, weight, reliability, and system performance.

SUMMARY OF THE DISCLOSURE

Measures of effectiveness (MoEs) of a system, including MoEs derived from physical variables and MoEs derived from non-physical variables, can be calculated using a single model using the same software system and the same set of data. Configuration and performance of trade-off studies may be facilitated. Data needed for simulation, including physical attributes such as inertia and spring rate and non-physical attributes such as cost, weight, and mean time between failures, may be persisted in the same manner. Different topologies may be created from the same model. A physical topology may include information that may be used to generate the governing systems equations based on laws of physics. A conceptual topology may include non-physical information, such as weight and cost information, and information that may be used to generate the governing systems equations based on probabilistic and/or deterministic principles. Conceptual topology information may include how many alternate paths may be provided for the system to deliver its intended function, and/or which building blocks may be included in a given path.

To determine the number of alternate paths and the building blocks involved in each path, a block may be determined to be active or inactive based on a state or states of a variable or variables associated with the block. A processor may simulate a physical model undergoing transitions from a starting operating condition to the other operating conditions in which only one path is active at a given time. Simulation results may be post-processed to find the set of building blocks that constitutes an active path. For each operating condition, the search may start with building blocks that apply a time varying load to the system. A search algorithm may be used to identify the active blocks that respond to the applied load. The search may end when no more active blocks can be found.

Cost and weight analyses may not require any topology information. However, hierarchical decomposition of cost and weight, e.g., how they roll up from components to subsystems and system levels may help in understanding how to reduce the cost and/or weight of a product or system. With the hierarchical decomposition, the total cost and weight of a system may be calculated by summing up the cost and/or weight of contributing subsystems and components.

A practitioner may wish to use a traditional fault tree or reliability block diagram for reliability analysis. Such diagrams may be generated automatically from conceptual topology information derived from the physical model.

Cost, weight, and/or system reliability may be used as measures of effectiveness for designing a system. Those measures may be included in a software package with parametric capabilities for what-if and sensitivity studies.

The above summary of various embodiments disclosed herein is not intended to limit the scope of the disclosure, which is defined solely by the claims. Additional objects, advantages, and features will become apparent from the following description and the claims that follow, considered in conjunction with the accompanying drawings.

BRIEF DESCRIPTION OF THE DRAWINGS

A more detailed understanding may be had from the following description, given by way of example in conjunction with the accompanying drawings wherein:

FIG. 4 illustrates a table showing how a spreadsheet may be used to store universal properties;

DESCRIPTION OF VARIOUS EMBODIMENTS

A detailed description of illustrative embodiments will now be described with reference to the various Figures. The following description of various embodiments implemented in a computing device is to be construed by way of illustration rather than limitation. This description is not intended to limit the scope of the disclosure or the applications or uses of the subject matter disclosed in this specification. For example, while various embodiments are described as being implemented in a computing device, it will be appreciated that the principles of the disclosure are applicable to lumped-parameter dynamic system and reliability system simulators operable in other environments, such as a distributed computing environment.

An electronic canvas may be used as the media for drawing and connecting building blocks. Diagramming tools may provide electronic canvases for drawing blocks, including various applications in the Microsoft OFFICE® productivity suite. A graphics design interface, such as the GDI+ graphics design interface available from Microsoft, may be used to draw rectangles and lines on a computer screen. Regardless of the selected tool, shapes such as rectangles can be used as icons for building blocks. Lines can be used to connect building blocks to represent relationships between connected blocks.

Building block properties such as type, label, and other physical or non-physical attributes may be persisted in various forms. For example, type-specific properties, such as spring rate, which is specific to springs, may be persisted within the shape. If the Microsoft EXCEL® spreadsheet software is used as an electronic canvas, the properties can be persisted as part of a shape's name. Persisting the properties with a shape may provide several advantages. For example, when a shape is deleted, the data associated with the shape is also deleted, thus eliminating the need to maintain a link between an external data repository and shapes on the canvas. Universal properties, e.g., properties that may be common to multiple (e.g., all) building block types, such as cost, MTBF, and weight, may be persisted in a common location such as a worksheet. If such properties are persisted in a common location, a change to a building block's cost, MTBF, and/or weight in the worksheet can then be propagated to all models using the building block. Universal properties may be persisted within a shape.

Figure 1:
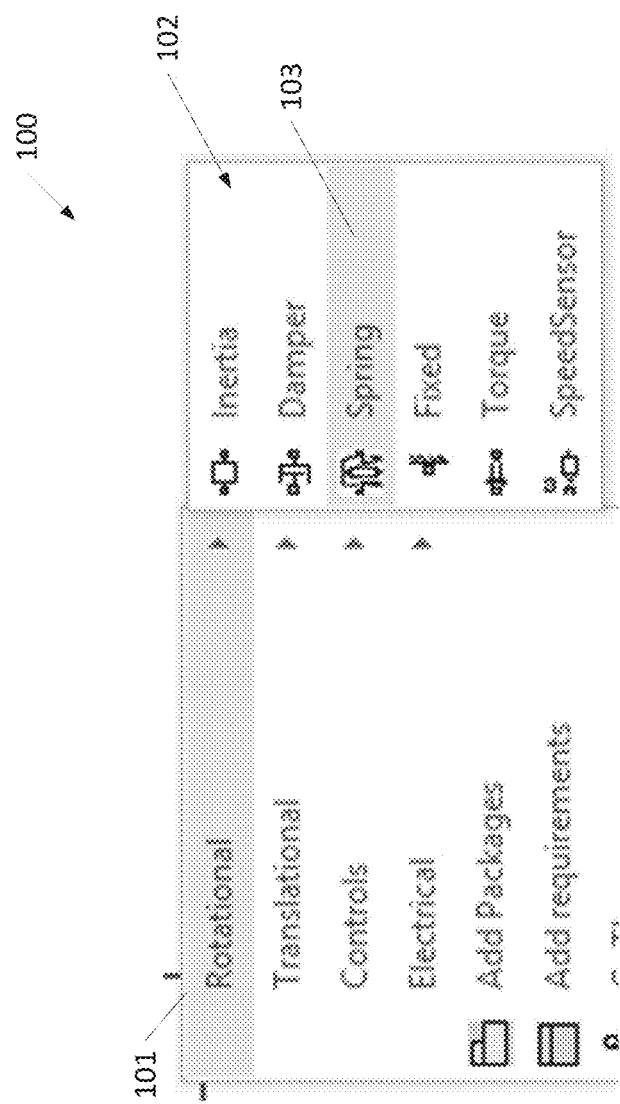
FIG. 1 illustrates an example dialog for selecting a building block from a menu.

Shape objects such as rectangles can be drawn on an electronic canvas to facilitate the creation and editing of building blocks. For example, a "select and click" method may be used to create instances of a building block. Menus can be provided to include families of building blocks, such as a first family of mechanical building blocks and a second family of electrical building blocks. One or more types of building blocks may exist in a family of building blocks. For example, a family of electrical building blocks may include building block types such as resistor, inductor, capacitor, etc. A user may select, e.g., right-click on, a canvas location to add an instance of a building block to a worksheet. This action may cause a command bar menu, e.g., a mini command bar menu, to appear. An example menu 100 is shown in FIG. 1. The user may then select a family of building blocks, for example, by clicking or moving the cursor over a "Rotational" option 101 on the menu 100. A fly-out menu 102 may appear. From this menu 102, the user may select a particular type of building block, for example, by clicking on a "Spring" option 103.

Figure 2:
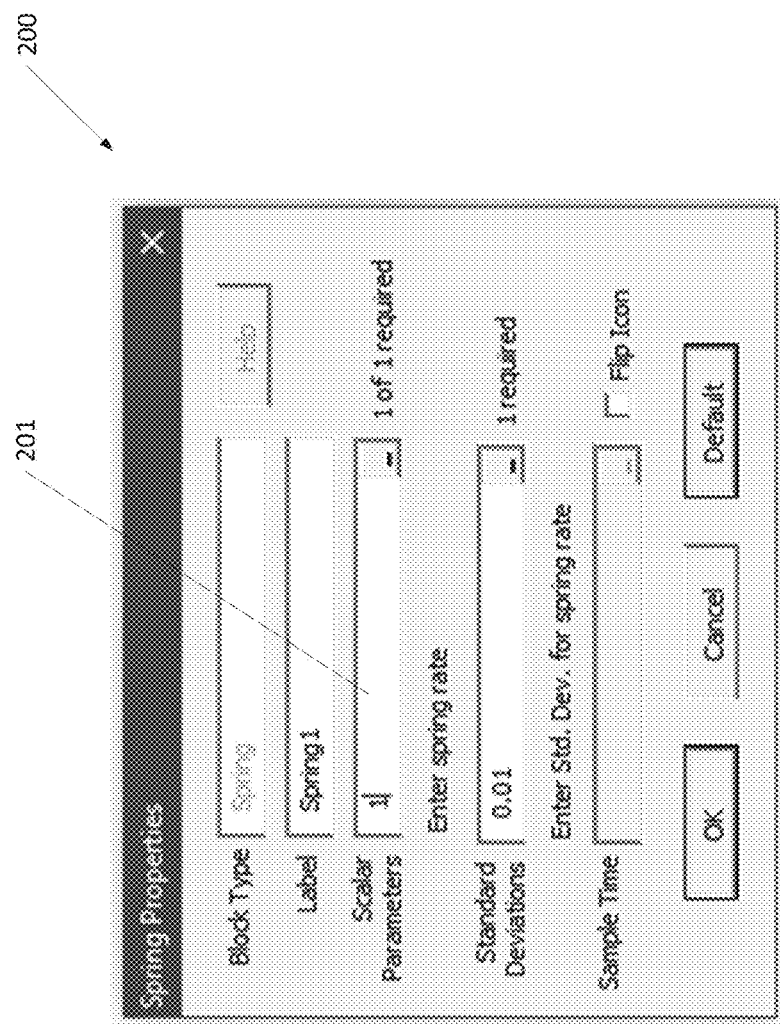
FIG. 2 illustrates an example dialog for entering building block properties on textboxes and other dialog controls.

A dialog box 200, shown in FIG. 2, may enable the user to enter the relevant information. For a "Spring" building block, which has an angular rotation and an angular velocity associated at each of its connection, this information may include the torque to wind the spring a given amount. The torque may be equal to the product of a relative angular rotation and a spring rate. The spring rate may be entered into a textbox 201.

Figure 3:
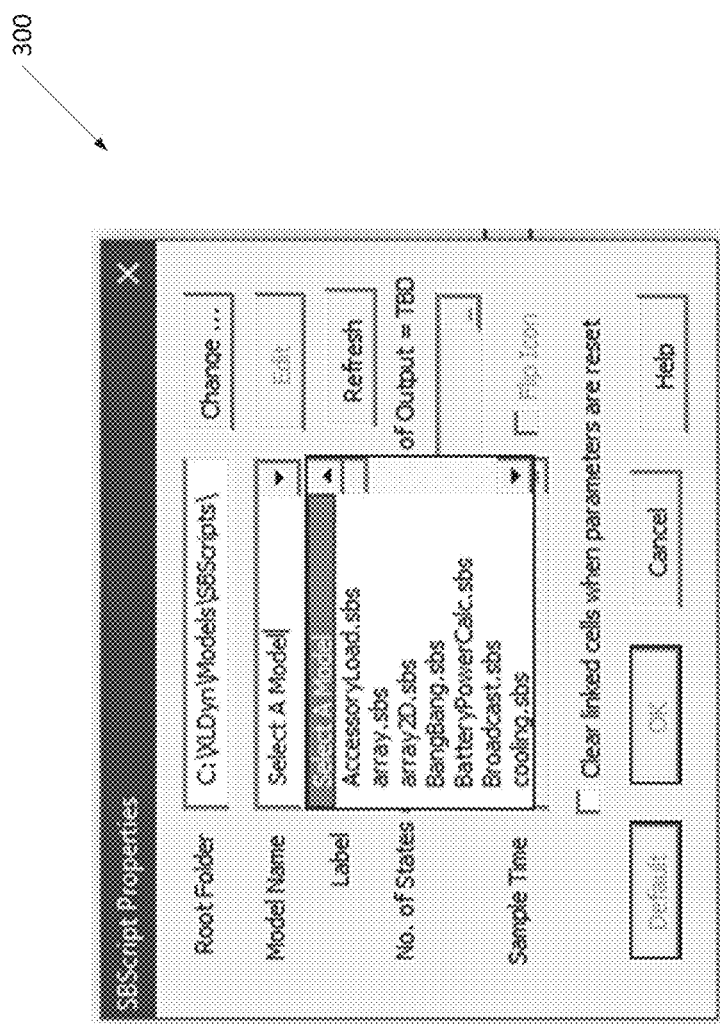
FIG. 3 illustrates an example dialog for selecting a user-defined building block from a drop-down list.

Dialog for other, e.g., more complex building blocks may differ from the one shown in dialog box 200. For example, the user may specify conditions for switching from a primary to a secondary system using a user-defined script. A dialog box 300 shown in FIG. 3 may enable the user to select a model that defines the block's input/output relationship. The script can be created prior to creating the building block, and can be in any format, including, but not limited to, c, Visual BASIC, or a proprietary format. For example, XLDyn, a lumped-parameter dynamic system modeler that uses the Microsoft EXCEL® spreadsheet software as an electronic canvas, may use a proprietary format.

Building blocks may have properties that depend on the building block type. For example, a "spring" building block may have properties that may include the spring rate, MTBF, weight, and piece cost. A "mass" building block may have properties that may include mass, initial displacement, initial velocity, MTBF, and piece cost. The properties of a building block may be persisted in some forms and locations. For example, the properties may be persisted in the shape itself, which may make data management associated with the building blocks simpler, easier, and faster.

Some properties, which may be known as universal properties, may be possessed by every building block. These universal properties may include, for example, weight, cost, and failure rates, and may be conveniently stored in a parts database or a worksheet with a part name or other identifier as the search key. The data can then be accessed to instantiate a model prior to simulation. Data stored in a database or worksheet may be reused across multiple models. FIG. 4 illustrates an example spreadsheet table 400 that may store universal properties.

Building blocks can be grouped in separate canvases to represent subsystems. For example, one group may be called subsystem A, and another group may be called subsystem B. An icon, called a superblock, can then be used to represent each of the subsystems in a third canvas. The third canvas may have other building blocks that may connect to superblocks A and/or B, and A may also be connected to B. Any connections made to and between superblocks A and B on the third canvas may be equivalent to connecting to one or more building blocks contained in the first two canvases. Thus, the third canvas may serve as a "main program," and superblocks A and B may serve as "sub-procedures" called by the main program. Grouping building blocks, like coding, may improve model clarity and may provide opportunities for reuse.

Building blocks on a canvas can be grouped to form a subsystem. Such groupings may be useful for breaking down cost by subsystems or for creating tree nodes used in fault tree analysis. A subsystem on the same canvas can be indicated by using appropriate graphics, for example, with a rectangle to enclose members of the group.

After the blocks are created, they may be connected pairwise in a way that is meaningful to the modeled system. For example, for a lumped-parameter dynamic system, a building block may be a physical block. A building block may be a signal processing block. Physical blocks may be associated with pre-defined state variables, such as displacement and velocity for mechanical building blocks, voltage and current for electrical, and temperature for heat transfer. The rates of change of the state variables may be governed by laws of physics. Signal processing blocks may or may not have state variables. Signal processing blocks may have one or more inputs and/or outputs. State variables, inputs, and outputs may represent any physical or non-physical entities.

When two physical blocks are connected by a line, the pair may share a common state variable, e.g., voltage, temperature, or displacement and velocity at the connecting point, or a node. When two signal processing blocks are connected by a line, the output from the first block may become the input to the second block. Lines connecting signal processing blocks are directional because the first block provides the output, and the second block receives it. A point where an output or an input is defined may be known as a port. Lines connecting physical blocks are not directional because switching the order of the blocks does not change the fact they share the same physical variable or variables.

Figure 5:
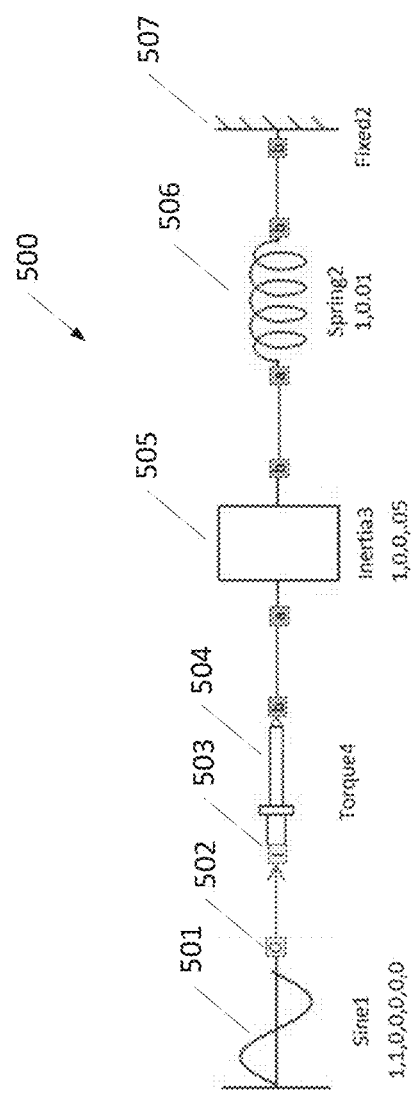
FIG. 5 is a diagram illustrating how building blocks can be connected to create a system model.

FIG. 5 illustrates an example of a lumped-parameter dynamic system model 500 in which a block 501 has an output 502 that is connected to an input 503 of a block 504 representing torque. The block 504 is connected to a block 505 representing inertia, which is connected to a block 506 representing a spring. The block 506 is connected to a block 507 that represents ground. The way the blocks are connected and the way the connections are interpreted is called a topology. Two models are topologically the same if they have the same content and the same connectivity, even though the blocks may differ in properties.

The graphical representation of a system model can be translated to a computer readable format called a netlist, which may be in the form of a human readable model description file. The following table shows an example netlist for the spring-mass system shown in FIG. 5.

| Type | Label | Property | Node ID | Input ID | Output ID |
|---|---|---|---|---|---|
| Inertia | Inertia3 | 1 | 2 | | |
| Spring | Spring2 | 1 | 1, 2 | | |
| Ground | Fixed2 | | 1 | | |
| Torque | Torque4 | | 2 | 3 | |
| Sine | Sine1 | 1, 1 | | | 3 |

The information contained in a netlist may be used to construct a system of ordinary differential equations (ODE) that governs the modeled system. For a mechanical system, the system of equations may be constructed by first assigning a displacement and a velocity for each mechanical node in the system. In the example spring-mass system there are two mechanical nodes, one belonging to Inertia3 and the other to Fixed2. The set of equations that governs the system may then be written as $[A]\{\ddot{x}\}=\{F\}$, where $\{\ddot{x}\}$ may represent the unknown accelerations and velocities belonging to Inertia3 and Fixed2, and $\{F\}$ may represent the forcing function. Persons skilled in the art will be cognizant of methods of assembling the matrix $[A]$ and the vector $\{F\}$. The unknown $\{\ddot{x}\}$ can be solved by a variety of methods, which can then be integrated to yield $\{x\}$ by using an ODE solver.

Figure 6:
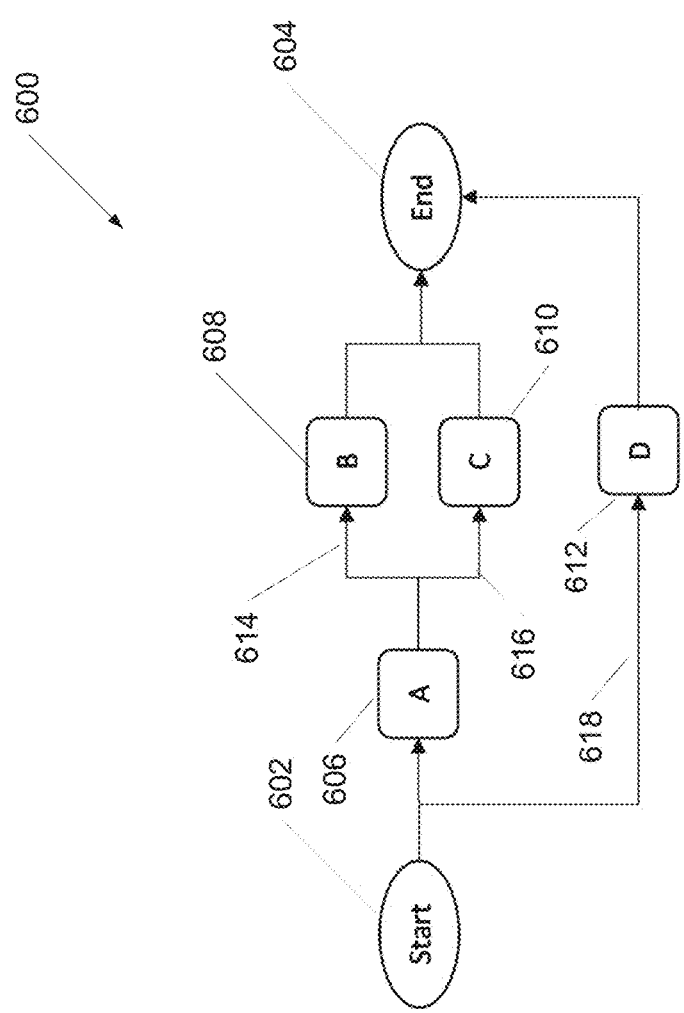
FIG. 6 is an example reliability block diagram that conceptually illustrates how system reliability can be calculated from failure rates of individual parts.

FIG. 6 illustrates an example reliability block diagram (RBD) 600 that may be used to calculate system reliability. An RBD may include connected building blocks that may depict the reduction or enhancement of system reliability based on application of probabilistic principles to occurrences of failure events. An RBD may have a starting point and an end point, as shown in FIG. 6 at reference numerals 602 and 604, respectively. Rectangles 606, 608, 610, 612 may represent conceptually different parts of the systems or subsystems, and the lines may represent how reliability is reduced or enhanced depending on the probabilistic relationship among the parts. The starting point may have a reliability of one, and the end point may have a reliability of less than one.

When two or more blocks are connected in series, e.g., blocks 606 and 608 of FIG. 6, the reliability of the blocks together, e.g., in series, may be the probability that at least one block fails. When a line branches into two or more paths, e.g., branches 614 and 616, the reliability of the paths taken together may be the probability that at least one of the branches succeeds. Thus, referring to FIG. 6, for the system to work, at least one of the subsystem combinations represented by paths 614, 616, and 618 works. The example shown in FIG. 6 has three parallel subsystems, two of which have components in series. One such subsystem may include blocks 606 and 608. Another subsystem may include blocks 606 and 610. Still another subsystem may include block 612.

For a series-parallel system such as the one shown in FIG. 6, the reliability may be calculated as follows. For each path, the reliability may be the probability that all components in the subsystem work. Thus, the reliability of path A-B, e.g., path 614, is $R_{A\text{-}B}=R_A R_B$, and that of path A-C, e.g., path 616, is $R_{A\text{-}C}=R_A R_C$. For the system as a whole, the reliability may be the probability that at least one subsystem works, e.g., $R=1-(1-R_{A\text{-}D})(1-R_{A\text{-}C})(1-R_D)$, where the product is the probability that all three subsystems fail to work. To calculate system reliability, a method may identify which blocks form a path, and how many paths are provided in the system. Note that the order of the blocks are not relevant since products, e.g., $R_A R_C$ and $(1-R_{A\text{-}B})(1-R_{A\text{-}C})(1-R_D)$ are commutative.

Figure 7:
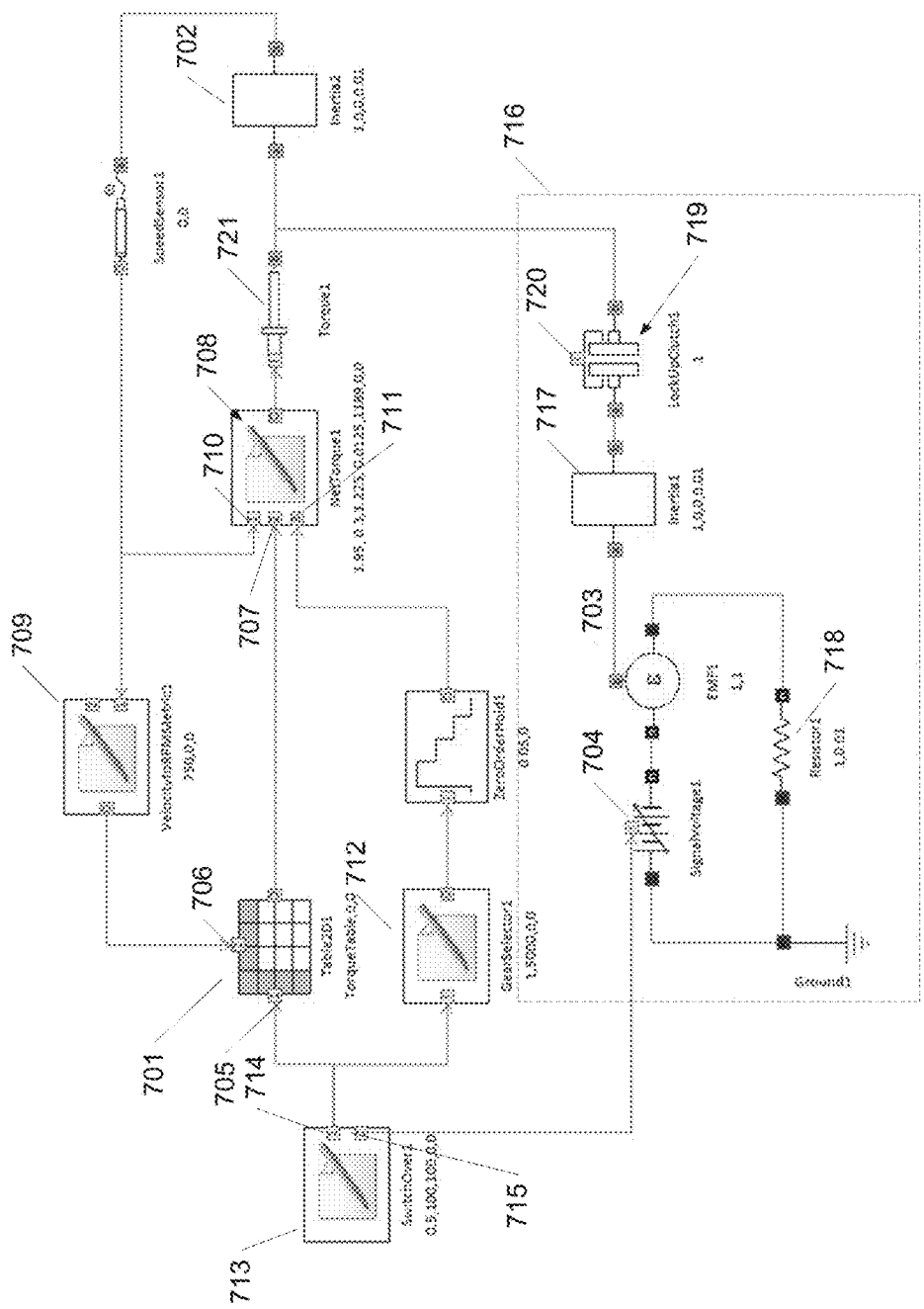
FIG. 7 is a diagram illustrating parts of an example hybrid electrical vehicle model.

Path information that may be used in system reliability calculation can be obtained from the results of simulating a lumped-parameter dynamic system model. FIG. 7 illustrates an example of a system with redundancy, e.g., a simplified model of a hybrid electric vehicle (HEV). A gasoline engine, modeled as a building block 701 including a lookup table, may be used as the primary power source to drive the vehicle, which may be modeled as a rotational inertia 702, inertia2. Should the primary powertrain fail, an electrical motor, modeled as an EMF1 building block 703, powered by a SignalVoltage building block 704, may provide the driving torque. Building block 701 outputs engine torque as a function of throttle position in percentage. This value may be received at a port 705, and engine speed in RPM may be a value received at a port 706. The engine torque may be input to another signal processing building block, NetTorque1 at a port 707. The engine torque may be reduced by the torques needed to overcome internal friction and aerodynamic drag. The friction and aerodynamic torques may be calculated by a NetTorque1 building block 708, from a vehicle speed and a current gear that are received through input ports 710, 711, respectively. A VelocitytoRPMMetric1 building block 709, may compute the engine speed in RPM from the vehicle speed in rad/sec and gear number. A GearSelector1 building block 712 may output the proper gear setting from the throttle position, a value received at its input port.

A secondary system may include the building blocks within a rectangle 716. An Inertial building block 717 may model the rotational moment of inertia associated with the electrical drive system. A Resistor1 building block 718 may model the internal losses. A LockUpClutch1 building block 719 may model a friction clutch. When the pressure received at its input port 720 is zero, no torque can be transmitted. When pressure is positive, the clutch is said to be closed or engaged, and the amount of torque that can be transmitted may be equal to a coefficient of friction multiplied by the pressure, the clutch surface area, and the equivalent clutch radius.

To identify the paths needed for reliability calculations, the system behavior undergoing a transition, e.g., from using the gasoline engine to using the Signal Voltage as the power source to drive the HEV, may be simulated. The transition may be executed by a SwitchOver1 building block 713, which may be programmed to set the throttle position at an output port 714 to zero at a specified time, and at the same time may apply a voltage at input port 704, and a pressure at input port 720, which may be connected to an output port 715. A connection between the input port 720 and the output port 715 may not be visible on a diagram, for example, if a remote connection is used. The setting of throttle position, voltage and pressure essentially cuts the engine power, energizes the electrical circuit, and engages the clutch. In general, if there are n paths (n>1) in a system, then the model may be subjected to n−1 transitions where after each transition, only one set of building blocks is active.

The results of simulation may be post-processed to identify the alternate paths in the system. An alternate path may be a set of building blocks that acting together, provides a required function. A building block can belong to more than one path, and one or more paths can be active at a given time. In the HEV example, one path is active before and after transition, and two paths are active during transition. Determination of the active blocks in a path is disclosed herein.

Blocks whose associated variables are constant or zero may be inactive blocks.

For example, for grounded mechanical systems with no loads, the velocity and displacement may be zero everywhere. This rule is derived from Newton's law of motion, $[A]\{\ddot{x}\}=\{F\}$, where for zero $\{F\}$, the acceleration and velocity vector, $\{\ddot{x}\}$, are zero. For ungrounded mechanical systems, for example, two masses connected by a spring, the acceleration and velocity vector, $\{\ddot{x}\}$, may still be zero. However, because the system is ungrounded, the displacement may be constant to satisfy the condition $\{\ddot{x}\}=0$. Displacement may be distinct from position. Displacement may be relative to a neutral position, while position may be relative to a fixed coordinate.

In determining whether a variable is zero or a constant, it may not be enough to inspect the simulation results at a given time t. For example, for a variable in the form of a sine wave, sin ωt is neither zero nor a constant since it varies with t. Yet, the function can be zero when time t is a multiple of π. Thus, to determine if a variable is zero or has a constant value, it may be required to inspect the variable over a time span. A sum of squares or a similar measure can then be used to determine if a variable is changing with time over the specified span. If $x_i$, i=1 n are the n data points that are being inspected, the variable may be deemed to be zero or constant over the interval if, and only if, $\Sigma_i(x_i-\bar{x})^2<\epsilon$, where $\epsilon$ is a small preset number, and $\bar{x}$ is the average of $x_i$ over the time span.

Figure 8:
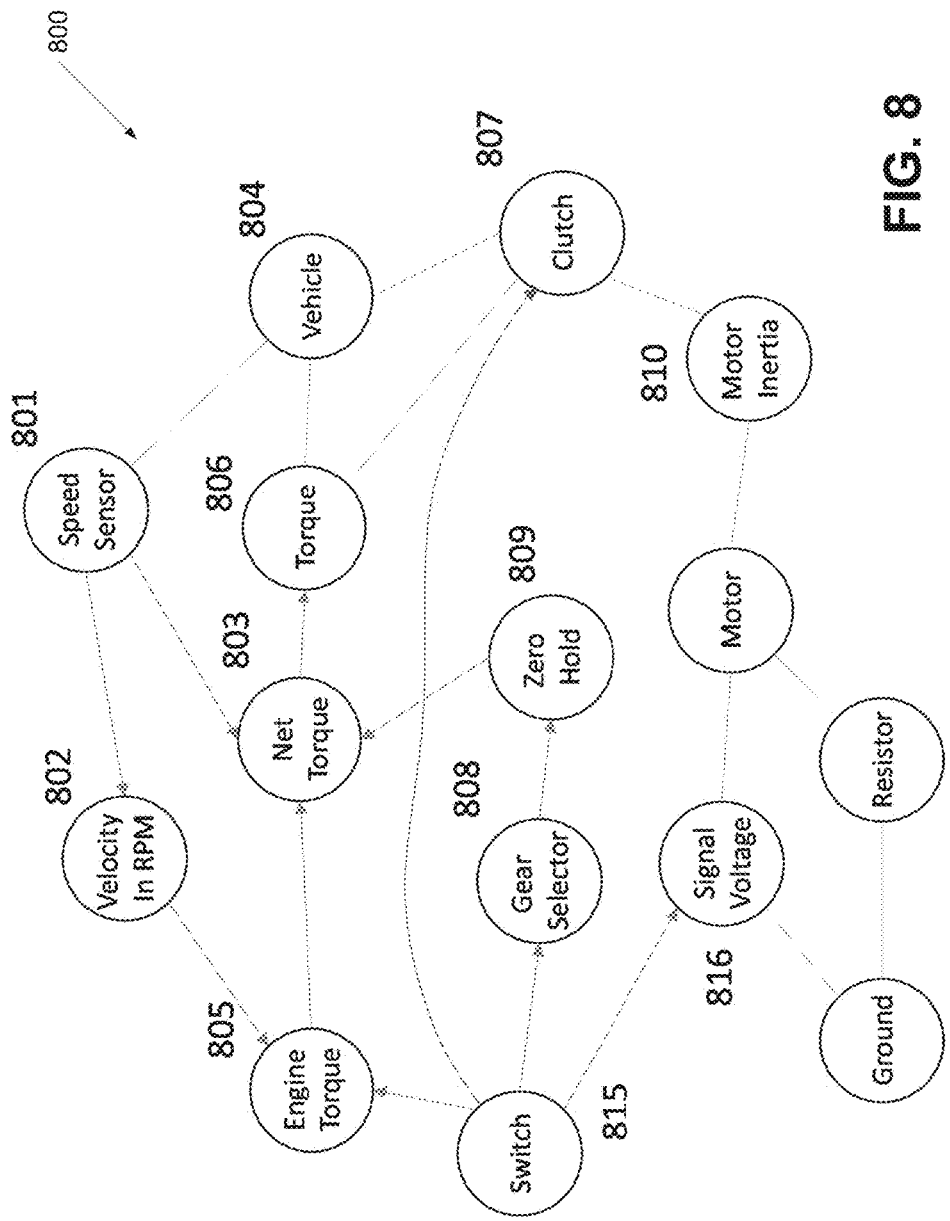
FIG. 8 is a graph illustrating how a search for active building blocks can be performed.

To identify the active blocks in the lumped-parameter dynamic system, a graph theoretic search algorithm (e.g., breadth-first search) may be used. FIG. 8 illustrates an example graph 800 representing the lumped-parameter dynamic model shown in FIG. 7. A diagram may be viewed as a collection of vertices and edges, shown as circles 801-810, 815-816 and connecting lines, respectively, in FIG. 8. Applied to a lumped-parameter dynamic model, a vertex may correspond to a building block, and an edge may correspond to a connecting line. The paths that may be available to traverse from one vertex to another vertex may be found. In the context of graph traversing, an edge can be directed or undirected. A directed edge may be one along which traversing is allowed in only one direction. An undirected edge may allow back-tracking.

A graph theory search may start with a vertex and may traverse (e.g., systematically) to other vertices in a series of steps. For each step, it may be determined which vertices are reachable, e.g., which vertices are the neighbors of the current vertex under consideration. A vertex B may be a neighbor of vertex A if B can be reached from A in one step. If the edge shared by A and B is undirected, and B is a neighbor of A, then A is also a neighbor of B. Applied to a lumped-parameter dynamic system model, lines connecting physical building blocks such as springs and masses may be undirected edges, while lines connecting signal processing blocks may be directed.

In a lumped-parameter dynamic system model, a neighbor of a building block can be determined by inspecting the connecting lines on an electronic canvas. Each connecting line may be associated with two blocks, e.g., A and B. If the connecting line has an arrow pointing from B to A, then B is a neighbor of A, but A is not a neighbor of B. If the connecting line has no arrow, then A and B are neighbors of each other. The directionality "from B to A" is significant in that it identifies B as a neighbor if B is providing a signal to A, but not if A is providing a signal to B.

In a physical model, certain building blocks, e.g., loaders, may apply time-varying loads to the system. Loaders may include, e.g., the Torque building block for rotational mechanic systems, the Force building block for linear mechanic systems, and/or the Signal Voltage building block for electrical systems. When values associated with these loaders are zero over a time span, the portion of a system that reacts to loaders msy be inactive. If the value associated with a loader is non-zero over a time span, then the same portion of a system may be active. This principle may be used to identify the portion of the system that reacts to a loader, and subsequently the series-parallel paths needed in system reliability calculation.

A breadth-first search may use a list to keep track of a vertex state (e.g., whether the vertex been visited) and the neighbors of a vertex. The search may be performed first with the system in a before-transition state. The search may start with an active loader in the system. For example, the system shown in FIG. 7 may be operating initially under mechanical power. Referring to FIG. 8, the search may begin with the loader Torque, 806, so the loader 806 may be put on the list and marked as visited. The neighbors of Torque may be put on the list, so the list becomes $\widetilde{806}$, 803, 804, 807, where the notation ⌒ may indicate that the building block has been visited. The search process may start anew at 803, which may result in a list of $\widetilde{806}$, $\widetilde{803}$, 804, 807, 801, 805, 809, where 801, 805, and 809 may be added as neighbors of 803. The recursive process of drilling down a vertex to add neighbors can lead to an infinite loop. A search algorithm may be programmed not to drill down a vertex that has been visited. A vertex state, e.g., whether a vertex has been visited, may be tracked and/or monitored. The search with the loader Torque 806 as the starting point may end with the inactive blocks on the list, e.g., 807 and 816. Clutch 807 may be inactive because no pressure is applied, and Signal Voltage 816 may be inactive because no voltage is applied.

A process disclosed herein may be repeated to identify the set of active blocks after the system has completed a transition. For example, the active loaders may be Clutch 807 and Signal Voltage 816. With those loaders as the starting points, the search may lead to a second path that may end at Switch 815 and Speed Sensor 801. The second path may include Switch 815, but not Gear Selector 808 nor Engine Torque 805 because the latter two may not output signals to Switch 815 and may therefore not be neighbors to Switch 815. The second path may not include Torque because Torque is inactive. The second path may not include Velocity in RPM 802 and Net Torque 803 because they may be downstream of Speed Sensor 801 and may not be neighbors of the sensor. Alternatively or in addition, a user may define paths and/or active paths.

The paths found, e.g., p1 and p2, may correspond, respectively, to the system operating before and after transition. In general, there can be two or more paths, p1, p2, p3, . . . . The reliability of a path pi may be calculated by treating all blocks in the path as connected in series, e.g., by using the formula $R_{pi}=R_1R_2, \ldots R_n$, where $R_k$, k=1, 2, . . . n may be the reliabilities of the individual blocks in path pi. The system reliability may be calculated by treating the paths as parallel, i.e., $R=[1-\Pi_j(1-R_{p1})$, where $R_{pj}$ may be the reliability for path pj.

Reliability calculation for a system with redundancies may assume that only one path out of multiple paths needs to work for the system to work. In some cases, known as "k out of n" system redundancies, at least k paths out of n total paths must work for the system to work. Active blocks may be identified before and after a transition as disclosed herein. Active paths may be identified as disclosed herein. Determination of system reliability may involve a combinatorial function. Also, alternative path information may be independent of loading. After the paths are determined, they may be stored in a file or worksheet and may be reused for load cases other than the one used to determine the paths.

Failure rates used in reliability calculations may be functions of loads. For example, parts may be more prone to fail at higher temperatures or stress levels. Failure rates may also depend on time. For the same operating conditions, failure rates may behave according to a "bathtub" curve, e.g., failure rates may be higher at the beginning and end of a part's life. Loads obtained by simulating the model, for example, force transmitted by a spring or temperature acting on a resistor, can thus be used to determine failure rates that depends on loads and time.

Figure 9:
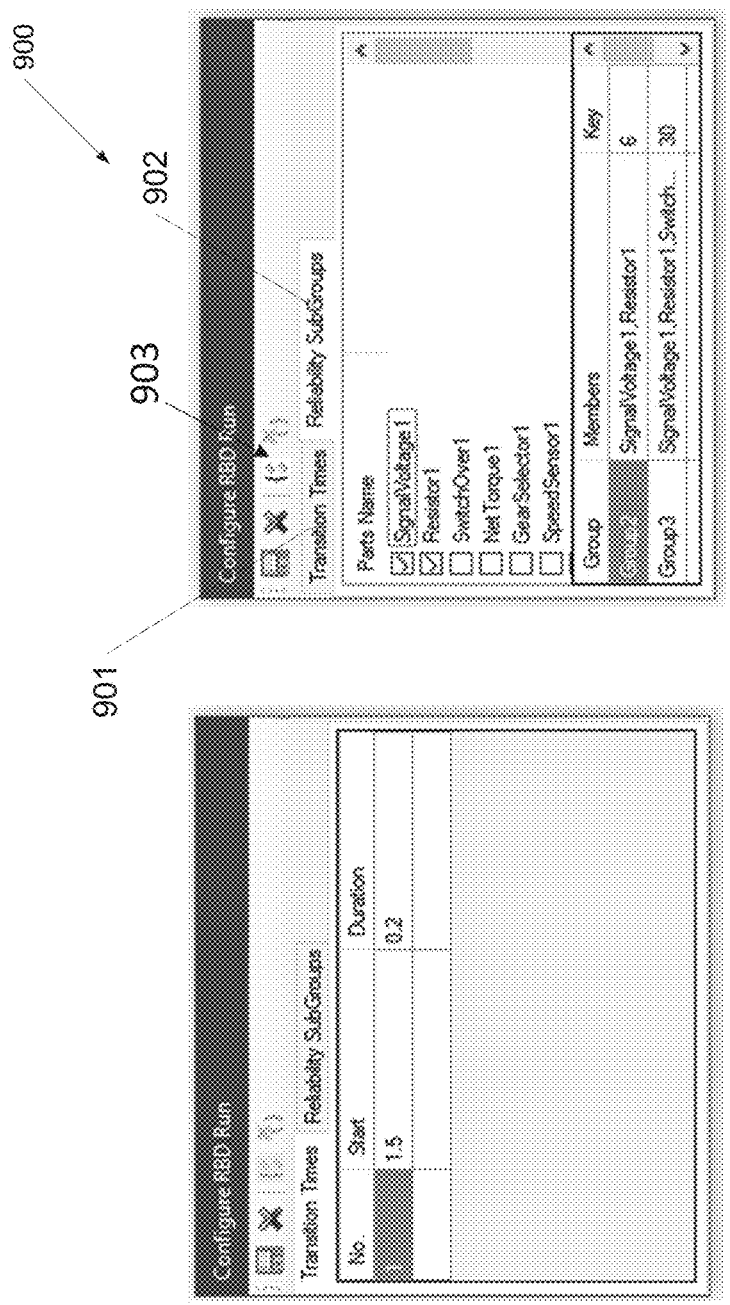
FIG. 9 is a diagram illustrating an example user interface for specifying transition times and reliability subgroups.

A graphical user interface can be used to configure the loading conditions used to determine the series-parallel paths, and also to define groups of building blocks whose joint probability of success is of special interest. An example graphical user interface 900 is shown in FIG. 9, which has tabbed pages, e.g., Transition Times and Reliability Sub-Groups. The Transition Times tabbed page 901 may be used to specify when transitions occur and for how long. The Reliability SubGroups page 902 may enable the user to select building blocks in the upper half of the tabbed page. The user can then click on a button 903 to define the selected blocks as a group. In this case Group2 may be defined to be the collection Signal Voltage1 and Resistor1.

Information about the alternative paths and blocks in each path, along with groupings of building blocks may be used to create traditional fault tree or reliability block diagrams on a separate canvas. The diagrams can be created programmatically with alternative paths laid out, for example, as rows of building blocks that are connected in series. The blocks in a given path may be given a unique color, leaving the layout and connecting blocks to the user.

Lumped-parameter dynamic models whose building blocks reside in separate canvases as members of a superblock may be handled automatically because the search for active blocks may be done after a performance simulation, which may have already logically connected the building blocks residing in separate canvases.

Figure 10:
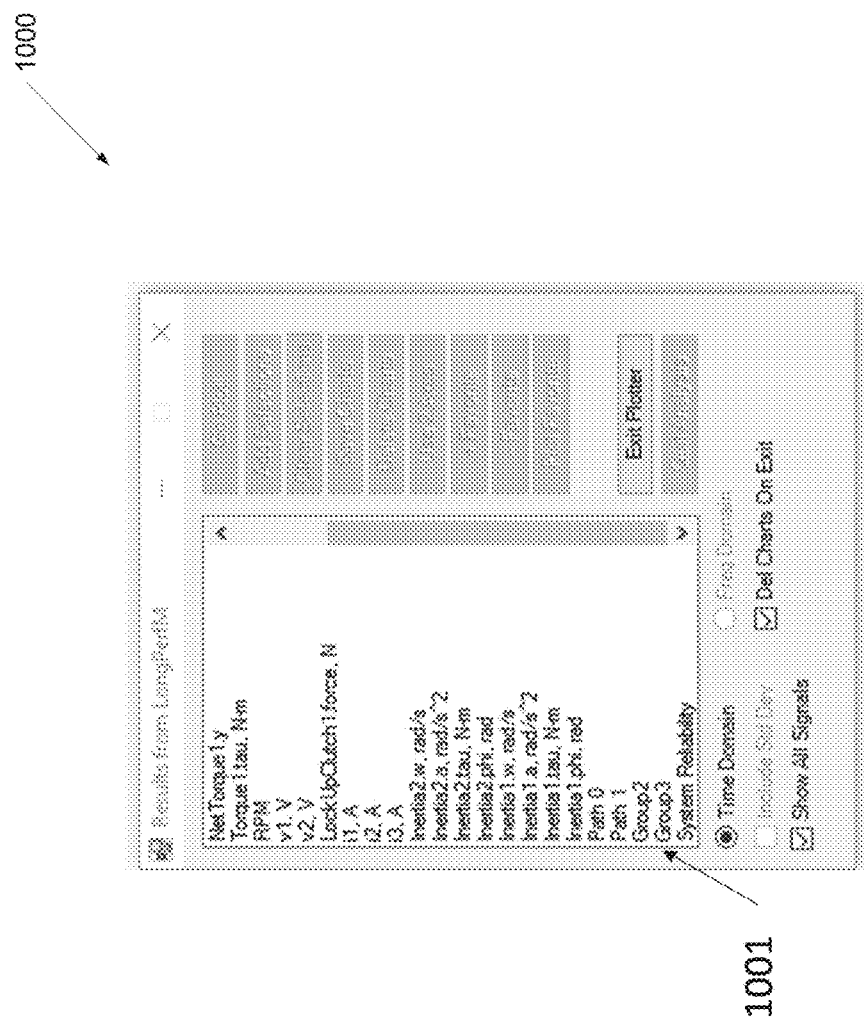
FIG. 10 is a diagram illustrating an example user interface for plotting performance and reliability simulation results.

Reliability calculation results can be made available for plotting as functions of time, just like other performance variables, as shown at an example graphical user interface 1000 of FIG. 10. In this example, the reliabilities of Path 0, Path 1, Group2, Group3, and the total system are available for selection in a menu 1001. A measure of effectiveness, e.g., the failure rate of the total system, may be set as a requirement to be met by a design. For example, assuming the underlying probability distribution to be exponential, the failure rate X can be related to reliability by using the formula $R=e^{-\lambda t}$, or $$\lambda = \frac{-\ln R}{t}, t > 0; \lambda = 0, t = 0.$$

Measures of effectiveness (MoE's) that may be related to weight, cost, and/or reliability can be included in trade-off studies. Several commercially available software applications include parametric capabilities where MoE's and their derivatives can be calculated for various combinations of design parameters. In the XLDyn lumped-parameter dynamic system modeler, for example, one can configure a Taguchi design of experiment to determine the parameters that has the most impact on a set of MoE's, where the parameter set can include any building block properties. The XLDyn lumped-parameter dynamic system modeler can also calculate the sensitivity matrix, $$\left[\frac{\partial F_i}{\partial x_j}\right],$$

for a given set of MoE's relative to a selected set of parameters.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include and computer-readable storage media. Examples of computer-readable storage media include, but are not limited to, a read only memory (ROM), a random access memory (RAM), a register, a cache memory, a semiconductor memory device, a magnetic media (e.g., an internal hard disc or a removable disc), a magneto-optical media, and an optical media such as a compact disc (CD) or a digital versatile disc (DVD).

What is claimed is:

1. A method of modeling a system comprising a plurality of components, the method comprising:
   using a processor to provide an electronic canvas;
   defining a plurality of shape objects within the electronic canvas, the shape objects representing the components of the system, at least one shape object being associated with a behavioral characteristic;

using the electronic canvas to define connections between the shape objects that represent relationships between the components of the system;

generating a model of the system as a function of the shape objects and the connections defined between the shape objects;

using a graph theoretic method to identify a set of active components of the system and a path comprising at least one of the active components; and determining a reliability of the system as a function of the identified active components and path of the system, the reliability of the system comprising a probability that at least one path of the system will deliver an intended function.

2. The method of claim 1, wherein the behavioral characteristic is associated with at least one of a cost, a failure rate, or a physical property of a component of the dynamic system.

3. The method of claim 1, further comprising identifying the at least one active component of the system by applying transition loading.

4. The method of claim 1, wherein determining the reliability of the system comprises identifying at least one active path of the system.

5. The method of claim 1, further comprising creating at least one of a reliability block diagram or a fault tree based on the model.

6. The method of claim 1, further comprising persisting simulation data in a shape object.

7. The method of claim 1, further comprising determining the influence of one or more components of the system on a measure of effectiveness.

8. The method of claim 1, further comprising performing a trade-off analysis based on at least one of reliability, cost, weight, or a performance measure of effectiveness.

9. The method of claim 1, further comprising performing a sensitivity analysis based on at least one of reliability, cost, weight, or a performance measure of effectiveness.

10. A non-transitory processor-readable storage medium storing processor-executable instructions that, when executed by a processor, cause the processor to perform a method of modeling a system comprising a plurality of components, the method comprising:

using a processor to provide an electronic canvas;

defining a plurality of shape objects within the electronic canvas, the shape objects representing the components of the system, at least one shape object being associated with a behavioral characteristic;

using the electronic canvas to define connections between the shape objects that represent relationships between the components of the system;

generating a model of the system as a function of the shape objects and the connections defined between the shape objects;

using a graph theoretic method to identify a set of active components of the system and a path comprising at least one of the active components; and determining a reliability of the system as a function of the identified active components and path of the system, the reliability of the system comprising a probability that at least one path of the system will deliver an intended function.

11. The non-transitory processor-readable storage medium of claim 10, wherein the behavioral characteristic is associated with at least one of a cost, a failure rate, or a physical property of a component of the dynamic system.

12. The non-transitory processor-readable storage medium of claim 10, further comprising identifying the at least one active component of the system by applying transition loading.

13. The non-transitory processor-readable storage medium of claim 10, wherein determining the reliability of the system comprises identifying at least one active path of the system.

14. The non-transitory processor-readable storage medium of claim 10, the processor-readable storage medium storing processor-executable instructions for creating at least one of a reliability block diagram or a fault tree based on the model.

15. The non-transitory processor-readable storage medium of claim 10, the processor-readable storage medium storing processor-executable instructions for persisting simulation data in a shape object.

16. The non-transitory processor-readable storage medium of claim 10, the processor-readable storage medium storing processor-executable instructions for determining the influence of one or more components of the system on a measure of effectiveness.

17. The non-transitory processor-readable storage medium of claim 10, the processor-readable storage medium storing processor-executable instructions for performing a trade-off analysis based on at least one of reliability, cost, weight, or a performance measure of effectiveness.

18. The non-transitory processor-readable storage medium of claim 10, the processor-readable storage medium storing processor-executable instructions for performing a sensitivity analysis based on at least one of reliability, cost, weight, or a performance measure of effectiveness.

* * * * *